United States Patent [19]

Rass

[11] 4,184,559
[45] Jan. 22, 1980

[54] SELF-PILOTING LAWN MOWER

[76] Inventor: Hans A. Rass, 303 St. Lawrence Ave., Beloit, Wis. 53511

[21] Appl. No.: 842,970

[22] Filed: Oct. 17, 1977

[51] Int. Cl.$^2$ .............................................. B62D 1/26
[52] U.S. Cl. .................................... 180/131; 56/10.2; 56/DIG. 15; 180/70 R; 180/169
[58] Field of Search ................... 180/131, 98, 79, 79.1; 56/10.2, DIG. 15

[56] References Cited

U.S. PATENT DOCUMENTS

| | | | |
|---|---|---|---|
| 2,815,633 | 12/1957 | Meyer | 56/DIG. 15 |
| 3,381,456 | 5/1968 | Taylor | 56/10.2 |
| 3,415,335 | 12/1968 | Wise | 56/DIG. 15 |
| 3,425,197 | 2/1969 | Kita | 180/79.1 |

Primary Examiner—Joseph F. Peters, Jr.
Assistant Examiner—Donn McGiehan
Attorney, Agent, or Firm—Howard I. Podell

[57] ABSTRACT

A lawn mower, designed with a set of built-in mechanical sensor and piloting mechanisms, which enable it to pilot itself along the edge line between the grass already cut and grass not yet cut, in a fairly straight course, and then to reverse its direction at the end of a run, move itself sideways towards the uncut grass and proceed with another run. The lawn mower will not move in an area where there is no grass, and an obstacle in its path will reverse it. The lawn mower drive wheels are driven by a planetary gear mechanism which is coupled both to the motor and to rotatable sensor brushes mounted ahead of the drive wheels so that the planetary mechanism transmits power to the drive wheels only when the sensor brushes encounter resistance, such as from uncut grass, ahead of the drive wheels. The planetary gear mechanism is mounted on a guide frame that is pivotally mounted to the drive wheel frame so as to engage a first of two counter-rotating gears linked on the wheel frame to the drive wheels. Forward impact against the guide frame causes it to pivotally rock so as to engage the second of the counter-rotating gears to reverse direction of travel of the lawn mower. The drive wheels of the lawn mower are formed of individual rim segments, each linked by an individual spoke that is pivotally mounted to the hub of the drive wheel, with spring bias latching the drive wheel spokes in a vertical plane except during periods of pivotal rocking motion of the guide frame. When the guide frame rocks to shift direction of travel of the lawn mower, the wheel spokes are unlatched to permit the weight of the assembly to cause the wheel spokes to pivot for a timed period causing the lawn mower to travel sidewise for the duration of the timed period.

2 Claims, 20 Drawing Figures

SELF-PILOTING LAWN MOWER

BACKGROUND OF THE INVENTION

Piloting and steering lawn mowers are disclosed in U.S. Pat. Nos. 3,073,409; 3,128,840; 3,130,803; 3,570,227; 3,744,223; and 3,789,939. They do not, however, suggest the effective, novel and reliable structure of the applicant's invention.

SUMMARY OF THE INVENTION

The invention is an engine-driven lawn mower with mechanical piloting devices which take into account the particularities of its operation and utilize the physical properties of the grass being cut. These devices include sensor brushes which guide the lawn mower along the edge line of the grass being cut, by engaging with the grass to be cut. This very same engagement also serves to allow the lawn mower to proceed only as long as there is grass, since the motive power is being supplied through a differential, simultaneously to power the drive wheels and the sensor brushes. Rocking movement of the guide frame, which supports the sensor brushes, relative to the wheel frame, allows the reversal of the direction of motion of the lawn mower. The rocking movement of the guide frame relative to the wheel frame is actuated by a sudden end of uncut grass (i.e. the lawn mower exiting from a grassy area) or by an obstacle, and is accomplished with the help of snap action means. Further, the wheels have a built-in mechanism for wobbling and progressing sideways, which is actuated during each reversal of the direction of motion of the lawn mower.

There is a provision for disengagement of power from lawn mower motion drive for manual pushing of the lawn mower.

BRIEF DESCRIPTION OF THE DRAWINGS

The objects and features of the invention may be understood with reference to the following detailed description of an illustrative embodiment of the invention, taken together with the accompanying drawings in which.

DESCRIPTION OF THE PREFERRED EMBODIMENT

Figure 1:
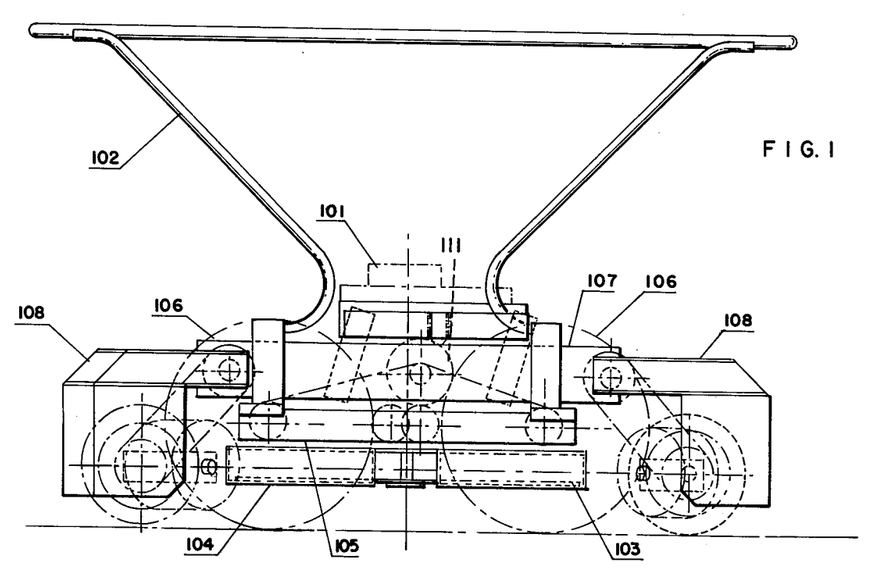
FIG. 1 is an elevation view of the invention.
Figure 2:
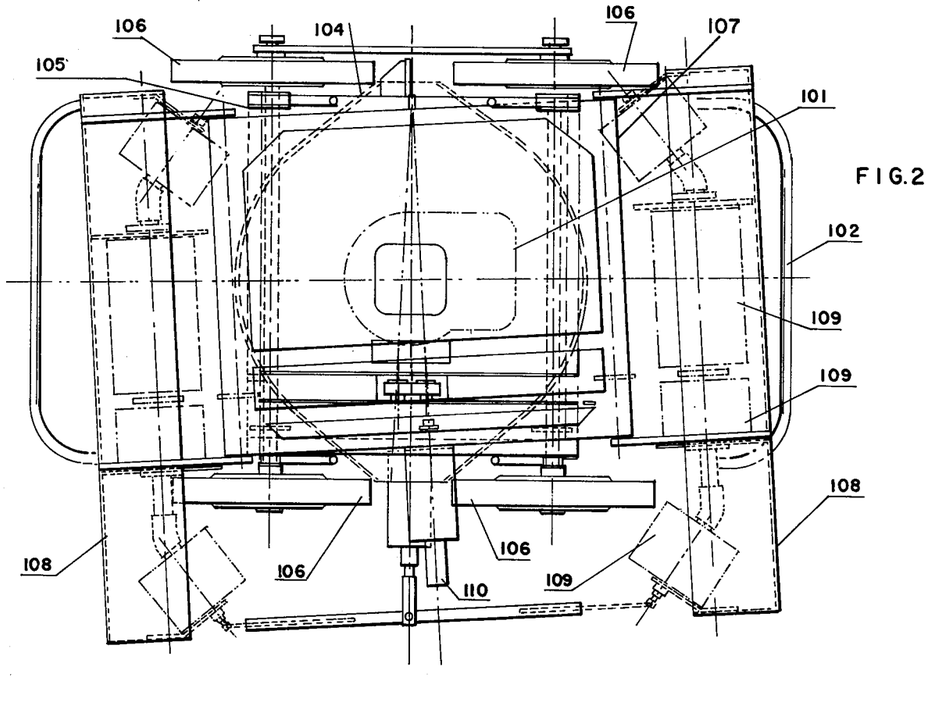
FIG. 2 is a plan view of the invention.
Figure 3:
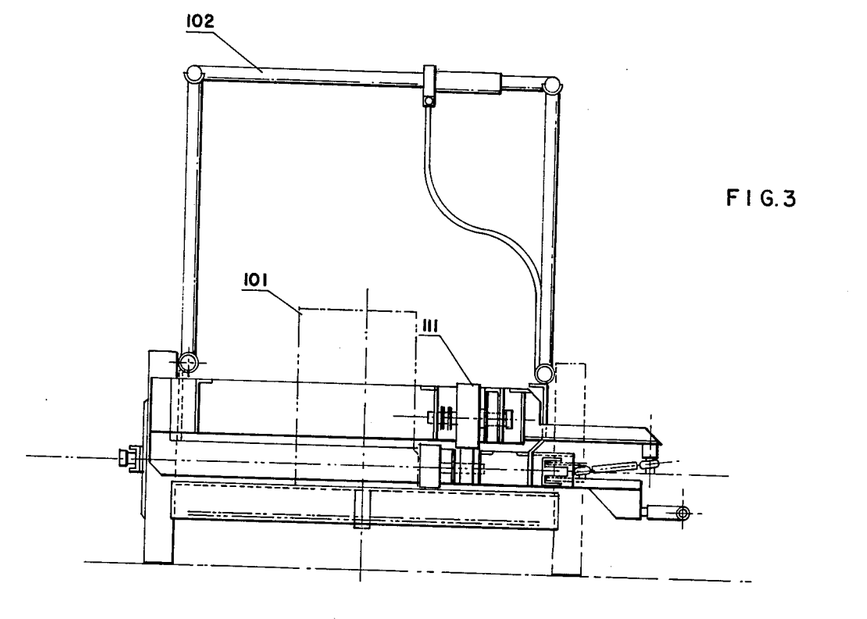
FIG. 3 is an end elevation view of complete lawn mower assembly.

Turning now descriptively to the drawings, in which similar reference characters denote similar elements throughout the several views, FIGS. 1–3 illustrate the overall view of the lawn mower assembly, which includes lawn mower engine 101, push handle 102, grass cutting blade 103 which is covered by housing 104. Frame 105 serves as the frame on which the axles of drive wheels 106 are mounted. The important parts of the invention, whose function and action will be explained later, include guide frame 107, sensor frame 108 (which encloses sensor brushes 109), toggle side travel actuator assembly 110, and planetary differential 111.

The rotor blade housing 104 is the guard for rotating cutter blades 103, driven by the engine 101; the engine 101 also serves as the source of energy for the propulsion of the lawn mower. The engine 101 is suitably mounted to housing 104.

Figure 4:
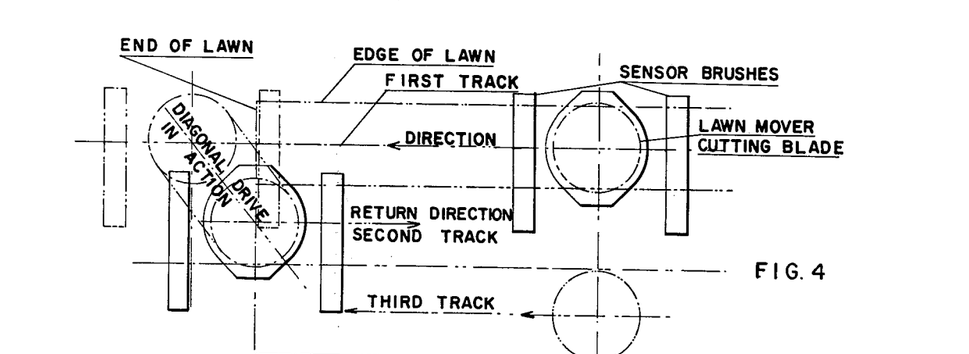
FIG. 4 is a planar schematic representation of a geometry of motion of the lawn mower in operation.

The travel path of the lawn mower motion in operation is illustrated diagrammatically by FIG. 4. On a planar surface, representing a lawn, the lawn mower is seen arriving from the right, progressing along first track while following the edge of the lawn. Arriving at the end of the lawn, on the left, the lawn mower will stop and reverse, and for a limited time interval proceed with a combined reversed and sideways motion, adding to a diagonal motion as shown, and then will revert to its fairly straight motion along the newly cut edge of the lawn, in opposite direction to the one followed in first track (i.e. will move from left to right). On the remote side of the lawn, to the right, similar reversal action will take place, and the lawn mower will switch to third track.

Figure 5:
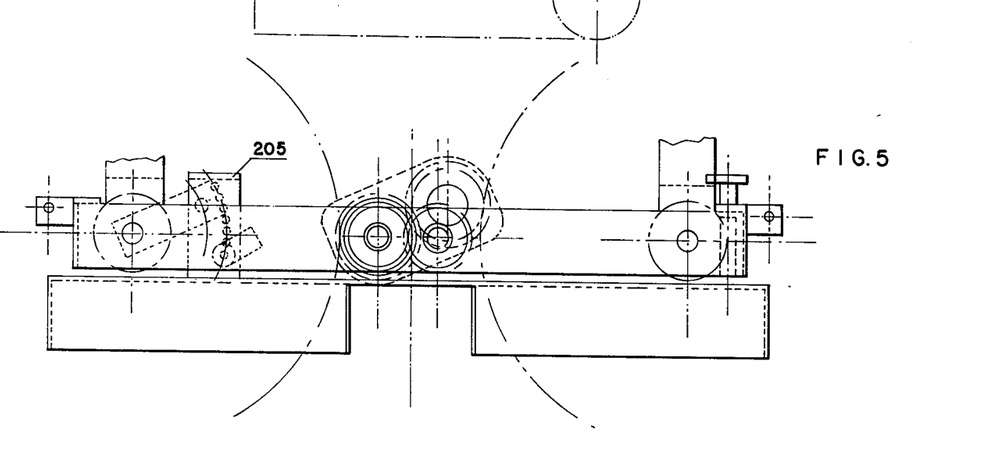
FIG. 5 is an elevation view of the wheel frame.
Figure 6:
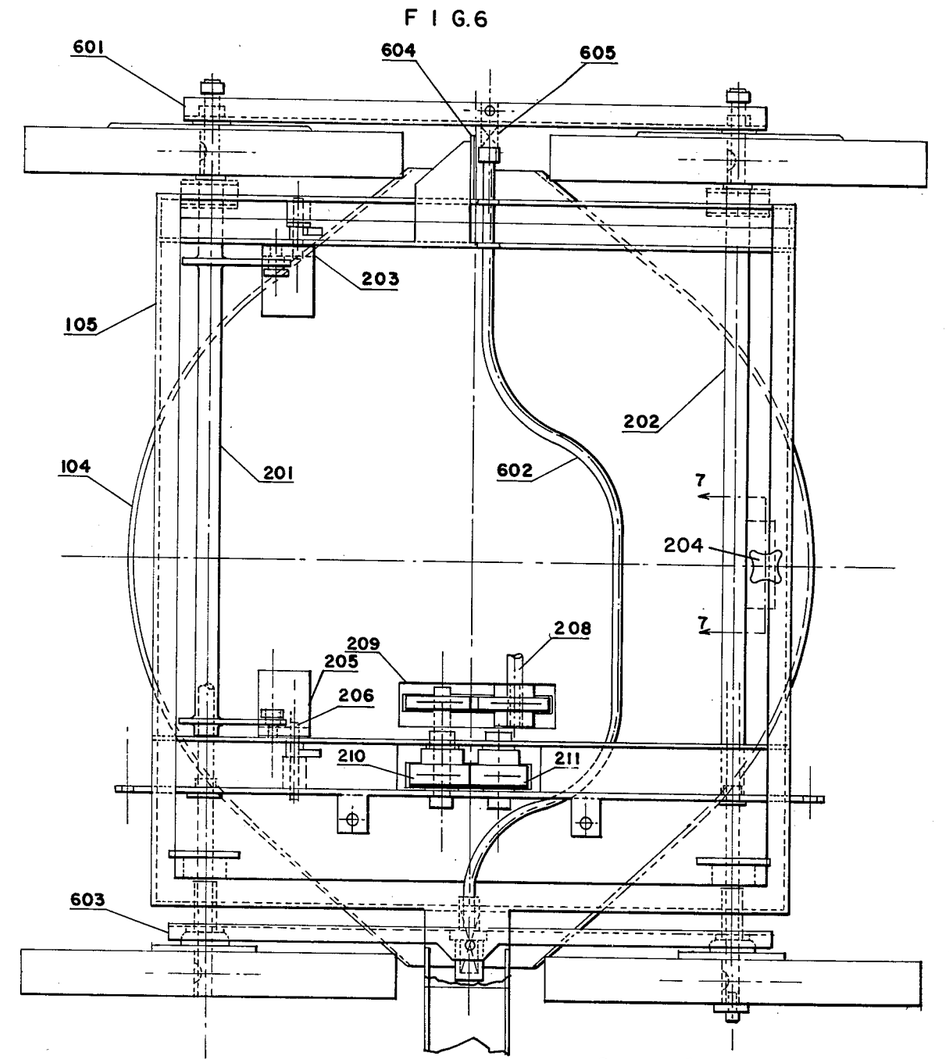
FIG. 6 is a plan view of the wheel frame.
Figure 7:
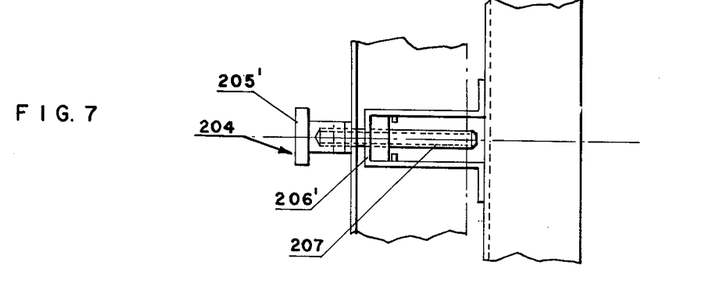
FIG. 7 is a detail section view taken along line 7—7 of FIG. 6.

Referring now to FIGS. 5, 6 & 7, the means of adjusting mounting rotor blade assembly (with housing 104) upon wheel frame 105 can be seen. There are three suspension points 203, 204, and 205. At 203 and 205 an adjustment of the relative position of drive axle 201 and housing 104 is done with an engagement pin 206, and at 204 the relative position of drive axle 202 (supported by frame 105) and housing 104 is regulated by the mechanism 204 of FIG. 7, with adjusting knob 205', adjusting nut 206' and adjusting screw 207. These adjustments determine the height at which grass will be cut.

The adjustments just described do not interfere with the power transmission from engine shaft 208 through gear box 209, in view of the arrangement seen on FIG. 5, which allows a certain amount of relative displacement of the engine assembly with housing 104 versus wheel frame 105. Gear box 209 drives a pair of spur drive gears 210, 211, rotating in mutually opposite directions; spur gears 210, 211 are mounted on the wheel frame 105.

Engine shaft 208 has a specific function t propel the lawn mower, and it is not to be confused with the rotor blade shaft.

Figure 8:
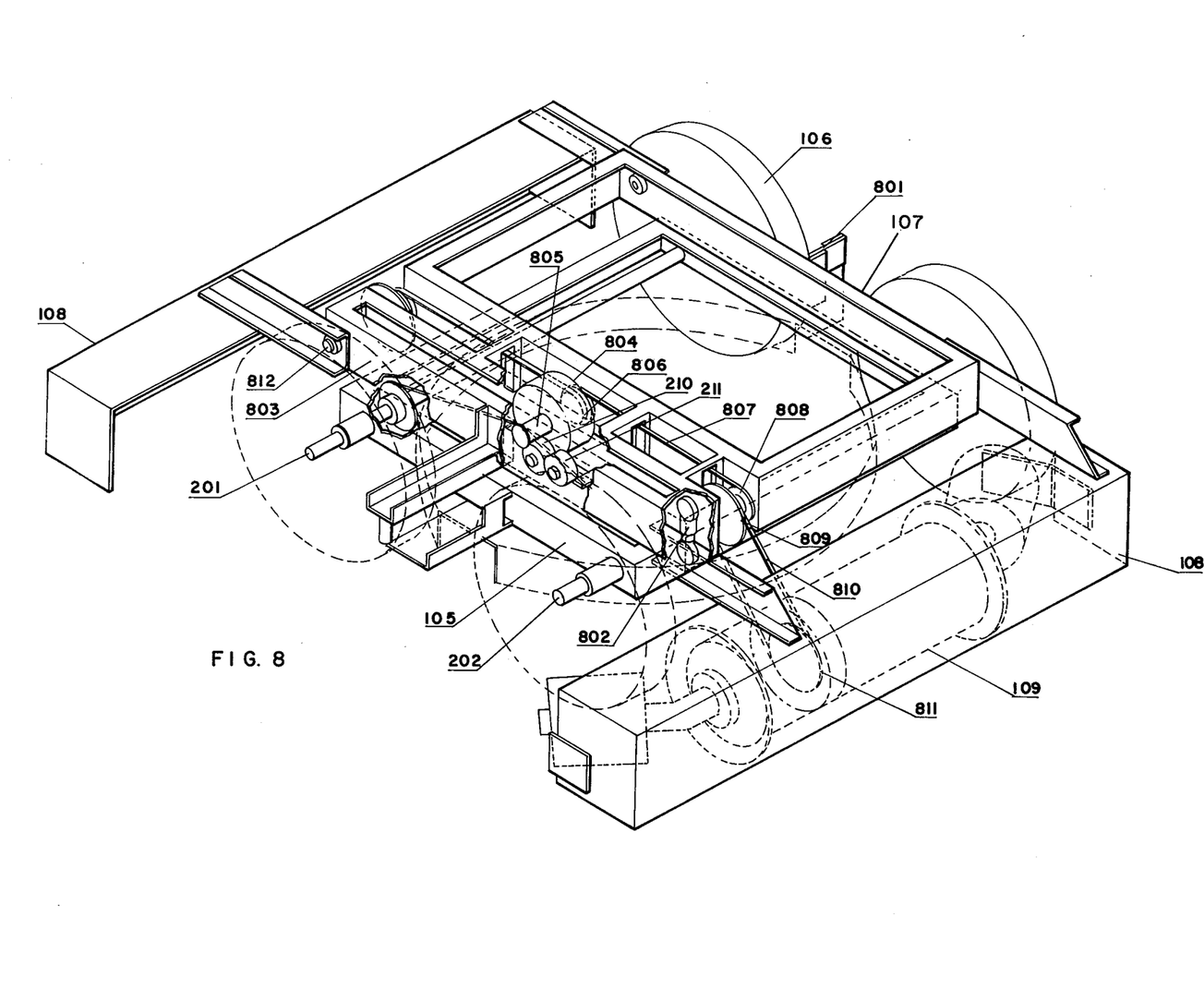
FIG. 8 is an isometric view showing the guide frame, mounted on the wheel frame and supporting the sensor brushes.

Guide frame 107 is located above wheel frame 105 and has a rather complicated shape of roughly two unequal rectangles bridged together; see FIG. 8. The guide frame 107 is maintained by the wheel frame with three point mounting, one of which is leaf spring 801, and two others are rod end connections 802 and 803. In addition to a degree of flexibility which this suspension affords for the guide frame 107 during a regular operation, allowing the guide frame 107 to maintain itself fairly parallel with the ground, this suspension provides two distinct positions for the guide frame 107, such that it can be rockingly moved from one position to another position. In one of these positions the housing 804 of differential 111 is in touch with, and is driven by drive gear 210, in the other position by drive gear 211, and thus is given either of two opposite directions of rotation. As shown in FIG. 8, shaft 805 of the planetary differential 111, through sprockets and a chain, drives wheels 106 by their axles 201, 202; at the same time, a sprocket and chain arrangement, through chain 807, idler sprockets 808 and 809, chain 810 and sprocket 811, drives sensor brushes 109 with another shaft 806 of the differential 111. As is well known, the differential 111 will transmit torque to both output shafts as long as both of them have a resisting torque; should torque of one of them disappear, the differential will idle. In the present invention this phenomenon is utilized; for as long as sensor brushes 109 engage with the grass to be cut and present a torque, the differential drive propels the vehicle. Thus, if there is no resistance from grass to the lawn mower, it will not travel.

Figure 9:
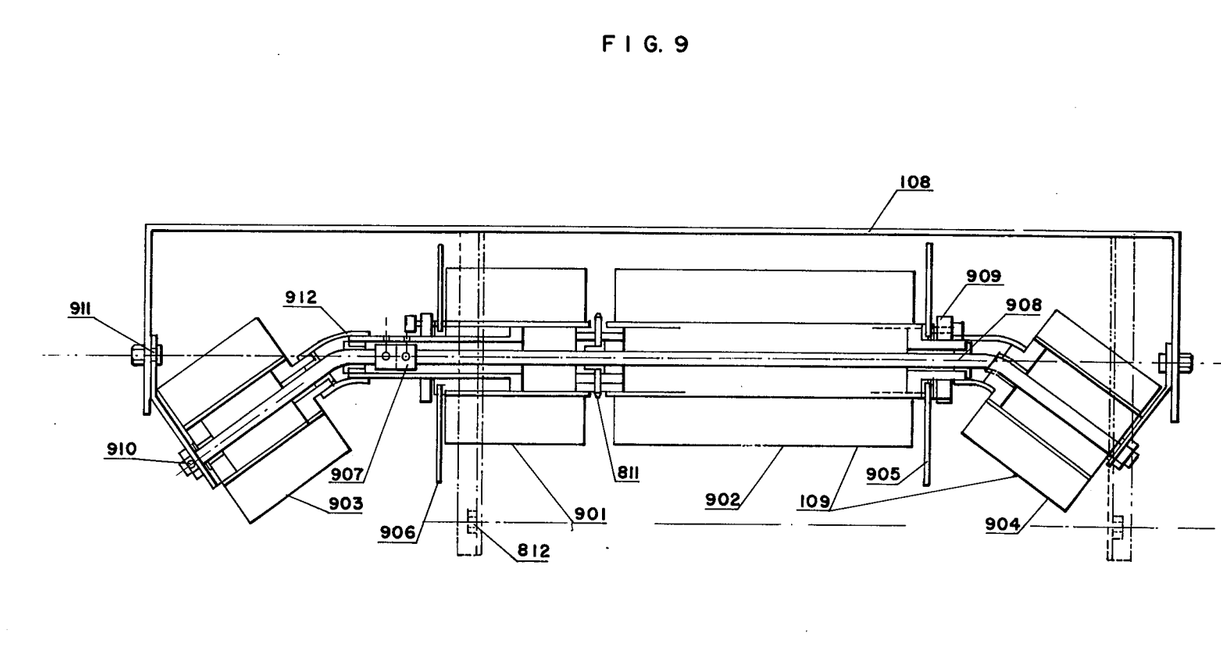
FIG. 9 is a section view taken along line 9—9 of FIG. 1 illustrating the sensor frame and sensor brushes.

Proceeding from FIG. 8 and FIG. 9, we will refer to the mounting of sensor frame 108 on guide frame 107. This is accomplished pivotably at two points 812 for each sensor frame. Sensor frame 108 holds the rotating brushes 109 which engage with the grass to be cut, and more specifically consist of center brushes 901, 902 and side brushes 903, 904. Guide discs 905, 906 are loosely retained by adjustable slipping clutch arrangement 909; the diameter of the guide discs 905, 906 determines the degree of engagement with the grass. All brushes 109 are rotatably mounted on stationary shaft 908, whose ends are bent backwards and pivotably connected at 910 via 911 to the sensor frame 108. The position of the side brushes 903 and 904 can be separately adjusted; sleeve coupling 907 affords an additional measure of flexibility. Side brushes are driven by flexible sleeve couplings 912 and exercise pull forces to the left and to the right. With proper adjustment, they will pilot the lawn mower along the edge of the grass being cut.

Figure 10:
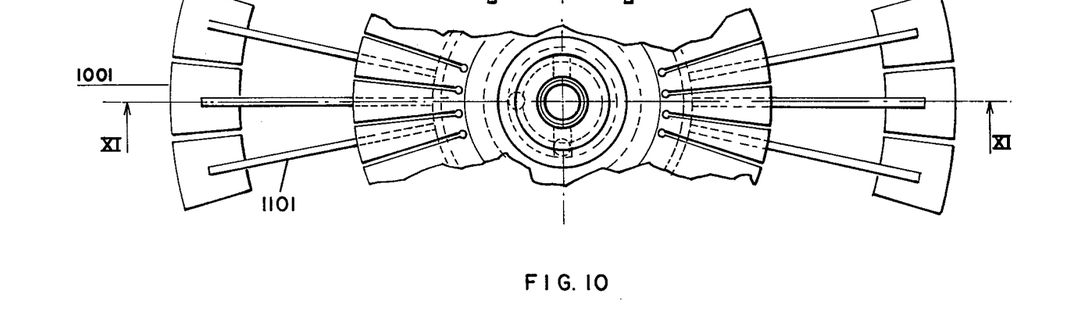
FIG. 10 is an elevation view of a drive wheel.
Figure 11:
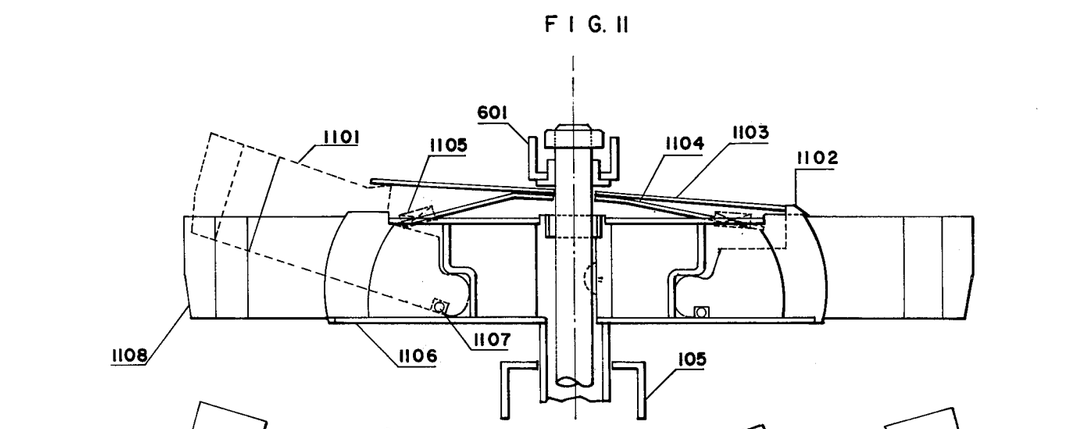
FIG. 11 is a section view taken along line 11—11 of FIG. 10, with the wheel in the wobble position.
Figure 12:
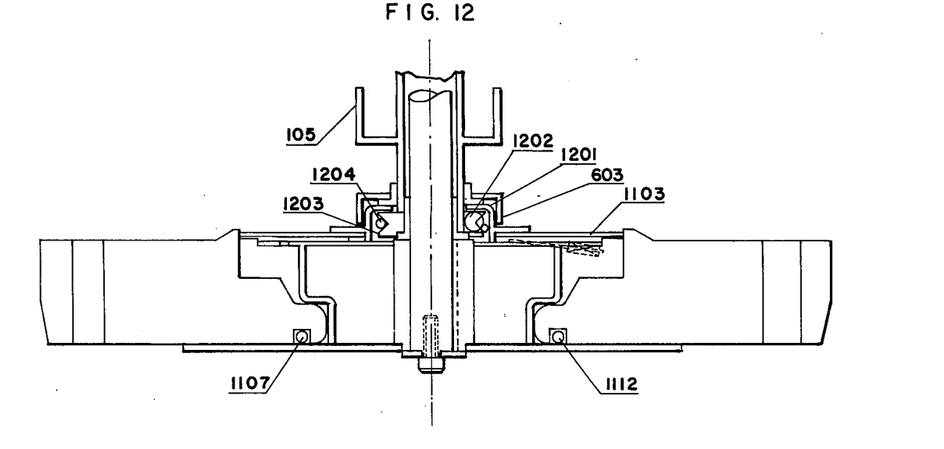
FIG. 12 is a section view taken along line 11—11 of FIG. 10 with the wheel in the normal position.

Turning now to FIGS. 10, 11 and 12, they show the design of "walking" wheels 106; i.e. wheels that are allowed to wobble to provide a sidestepping motion; references will also be made to elements shown in FIG. 6. The periphery of the drive wheels 106 consists of a series of circular ring sections 1001 each separately maintained by a spoke 1101 each having a spoke extension 1102. The hub of the wheel 106 normally maintains each spoke 1101 in radial direction, with the force of pressure disc 1103 acting upon spoke extension 1102, while receiving support from pressure bars 601, 603. Pressure bars are laid out a bit differently due to unsymmetry inherent here, as can be seen on FIG. 6, and are interlinked with cable 602, wherein pressure bar 603 initiates and bar 601 follows its action as explained below. Springs 1105 supported by spring tensioner frame 1104 throw disc 1103 out of its supporting position, as shown on FIG. 11, where the spokes are shown as allowed to tilt, up to the limit defined by the very same disc 1103, and stationary disc 1106. The whole set of spokes is maintained in the wheel 106 by an endless coil spring 1112 or rubber band placed into groove 1107; this spring 1112 will possess enough restoring force to overcome the weight of the spokes along and pull them back into upright positions.

Once pressure bar 603 is given an impulse which throws it out, momentarily, of its supporting position, a timed cycle of side wobble motion starts. Springs 1104 will throw disc 1103 off, and the weight of the assembly, due to undercut 1108 in all spokes 1101, will let it tilt sideways, the spokes 1101 wobbling while they are on the ground, with all wheels 106 cooperating due to cable 602 linking pressure bars 601 and 603. The time of the wobble action is limited by timer mechanism set within timer casing 1201 and consisting of steel ball 1202 riding upon retainer ring 1203, having two notches set 180° apart that retain steel ball 1202, with rubber band 1204 in a groove of ring 1203 to force steel ball 1202 out of the notch when timer casing 1201 is separated from retainer ring 1203. Once fallen out of a notch, it will take 90° of travel for the steel ball 1202 to reset itself; in the meantime it prevents pressure bar 603 (and consequently 601) from keeping wheels 106 straight.

Figure 13:
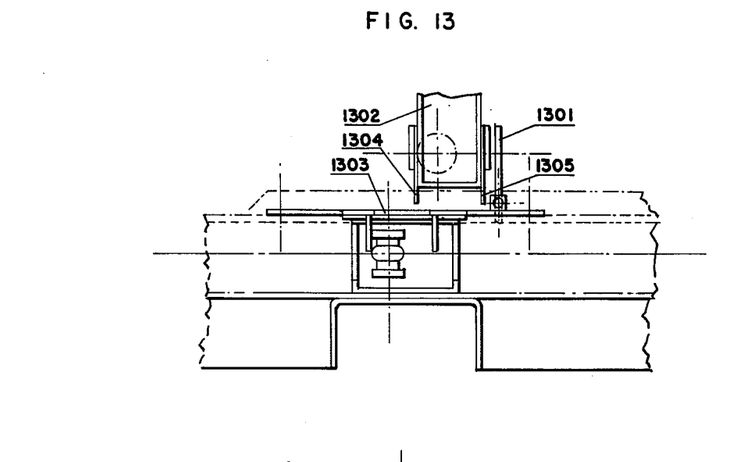
FIG. 13 is an elevation view taken along line 13—13 of FIG. 15.
Figure 14:
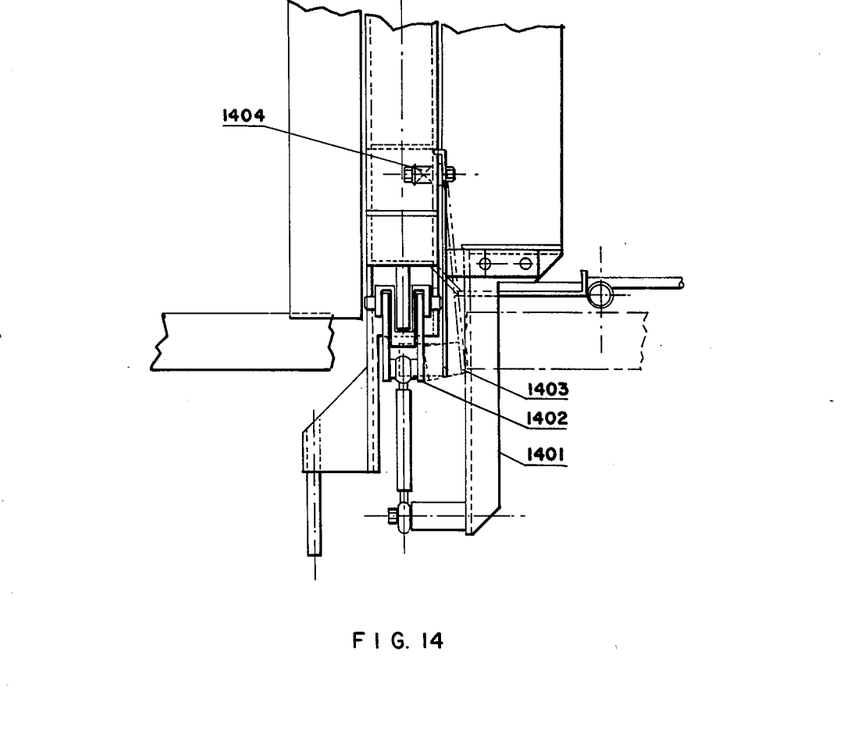
FIG. 14 is a side elevation view taken along line 14—14 of FIG. 15.
Figure 15:
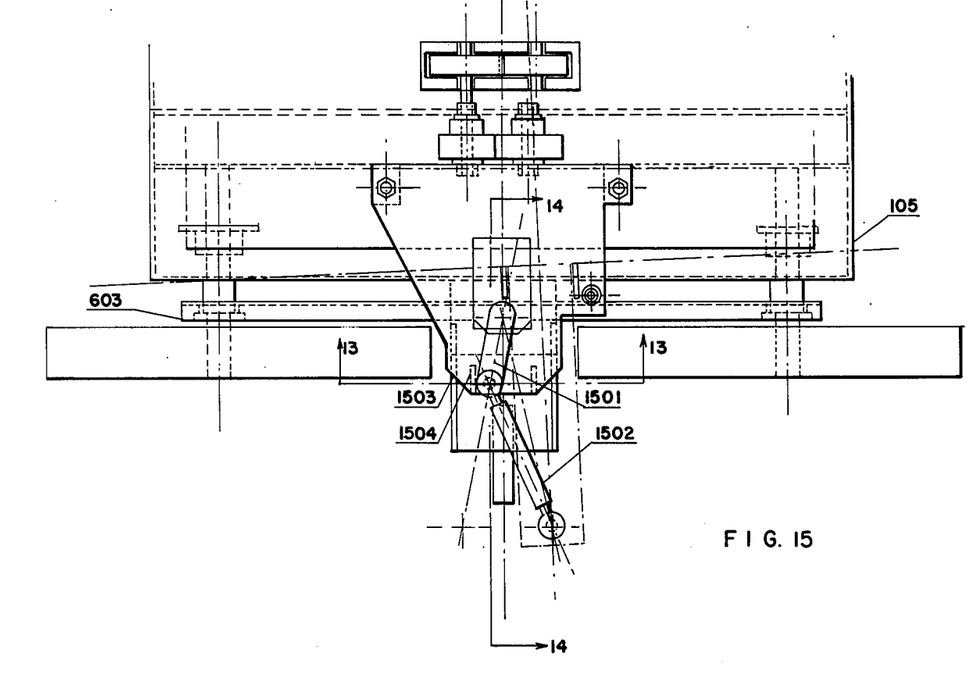
FIG. 15 is a plan view of a toggle mechanism designed to mementarily unlatch the drive wheel spokes during reversal of direction of motion of the drive wheels.

FIGS. 13, 14 and 15 explain the action of a toggle mechanism designed to initiate the reversal of direction of motion of the lawn mower, to push away pressure bar 603, thus activating side wobble action just described. Toggle link 1501 is supported by pressure bar 603; geometrically part of wheel frame 105; toggle link 1502 is supported by toggle retainer bracket 1401 set into guide frame 107; they join each other at 1402 by toggle retainer 1503 set onto wheel frame 105; limiters 1504 limit toggle movement which occurs with each rocking movement of the guide frame 107, wherein the toggle assembly pushes link 1501 and thus pressure bar 603.

The set of drawings, FIGS. 13, 14 and 15, also illustrate the means of power drive disconnection. As pointed out earlier, the differential housing 804 rests upon either of two drive gears 210, 211 rotating in opposite directions; there is no neutral position. To disconnect the power drive, differential 804 must be separated from both gears 210, 211 and toggle 1501-1502 disabled. This is accomplished when the toggle retainer 1503, which is spring mounted at two points 1404 to the wheel frame 105, is lifted together with its limiters 1504 from the frame 105 with pull cable 1301 and assumes position 1403. Pull cable 1301 can be run towards a convenient location, such as handle 102. The action of toggle retainer 1503 also lifts the whole guide frame 107 with leaf spring attachment 1302, thus separating differential 804 from both gears 210, 211. The rectangular hole 1303 in the toggle retainer 1503 is allowed alternative action by either of the leaf springs 1304, 1305.

Figure 16:
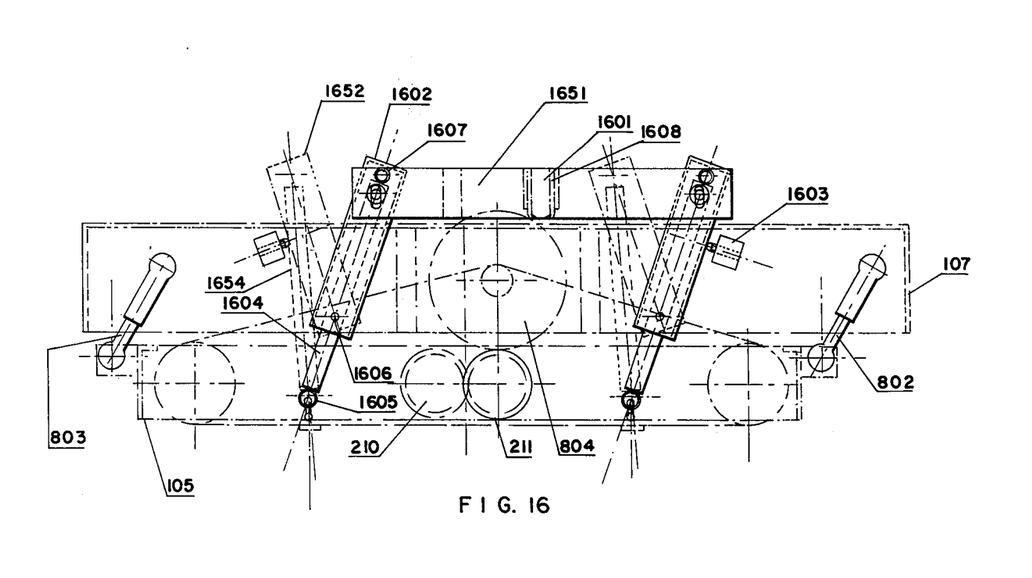
FIG. 16 is a detail elevation view of the two frames.
Figure 17:
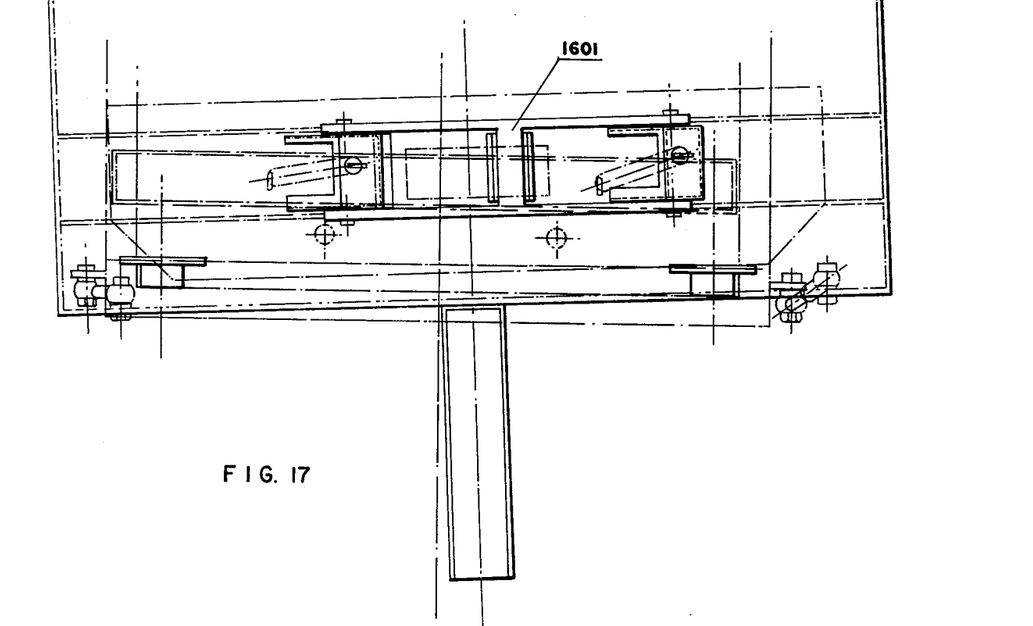
FIG. 17 is a detail plan view of the two frames.
Figure 18:
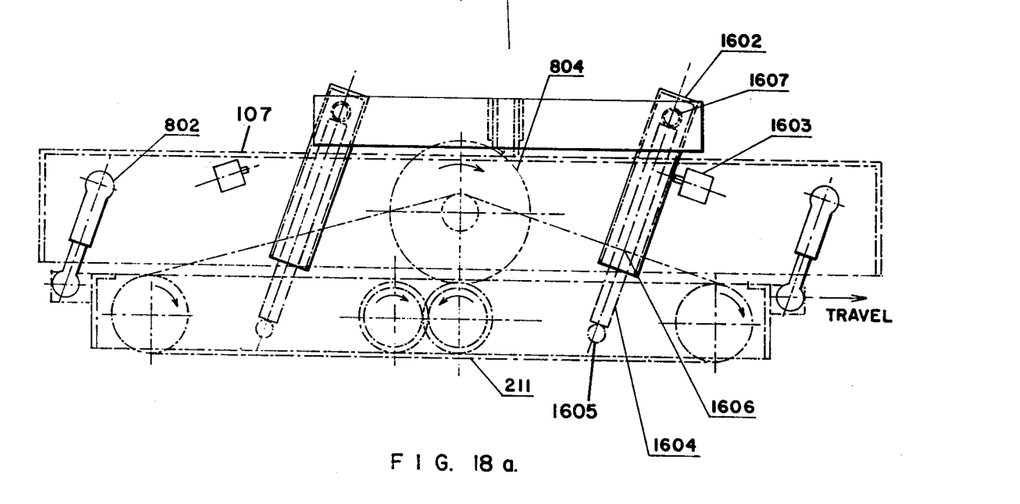
FIGS. 18a–18c are detail elevation views of the two frames, in sequence during shifting of direction of travel.
Figure 18B:
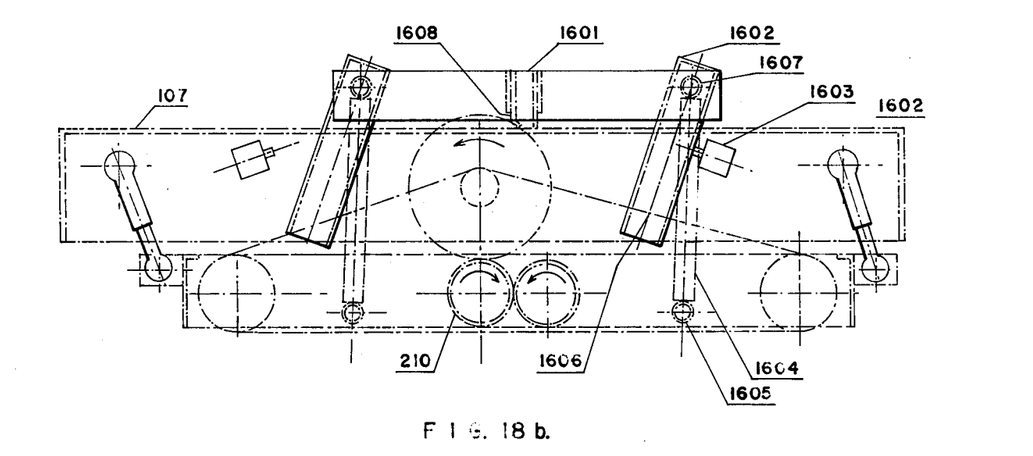
Figure 18C:
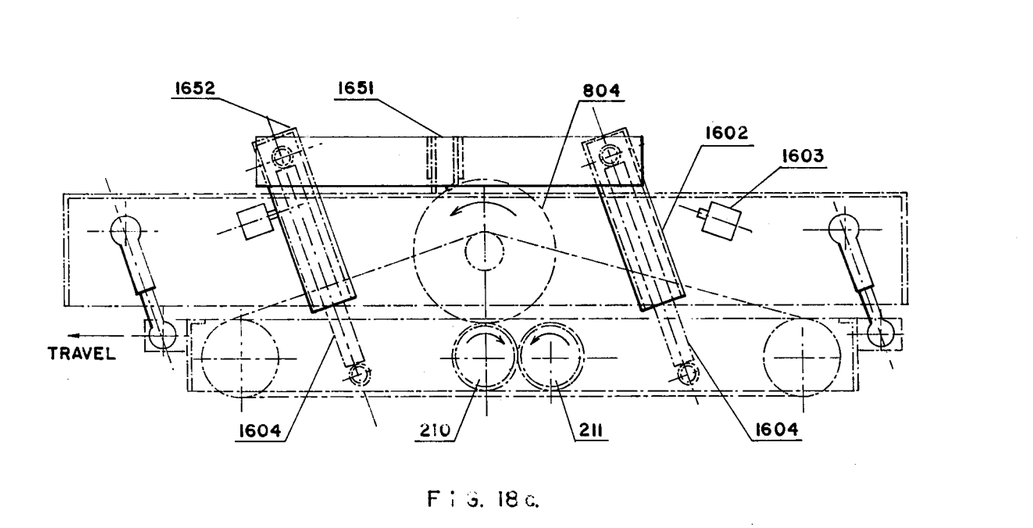

FIGS. 16, 17, and 18a–18c show a mechanism designed to actuate a reversal of direction of lawn mower motion in response to either a collision of the lawn mower with an obstacle, or in response to sudden disappearance of grass from under the brushes 109, when the lawn mower leaves a grassy area. As shown in FIGS. 16 and 18a differential housing 804 rests on drive gear 211, the guide frame 107 tilting to the right on rod end connections 802, 803. Charger frame 1601 is shown in its rightward position, right arch bracket 1602 resting against right stop 1603, point of anchoring point 1605 aligned in a straight line with pivoting point 1606 and anchoring point 1607 of coil spring 1604 on the charger frame 1601; thus spring 1604 helps to establish good contact between differential housing 804 and drive gear 211. Spring 1604 is preloaded in this position, as will be explained below, and should a jolt (such as an obstacle impact upon sensor frame 108, or a fairly sudden disappearance of grass while the lawn mower is in motion) disturb the equilibrium, the alignment of points 1605, 1606 and 1607 will topple and the force of spring 1604 will move guide frame 107 to the left, as shown in FIG. 18*b*. At this instant the differential housing 804 will come in contact with gear 210, and the spring 1604 will be loaded when the now counter clockwise rotating housing 804 surface will provide the charging force by acting upon rubber strip 1608. Frame 1601 moves into position 1651 and brackets 1602 into position 1652. The mechanism will thus be reset and ready for next action, to travel in the opposite direction, as shown in FIG. 4 and FIG. 18*c*.

Since obvious changes may be made in the specific embodiment of the invention described herein, such modifications being within the spirit and scope of the invention claimed, it is indicated that all matter contained herein is intended as illustrative and not as limiting in scope.

Having thus described the invention, what I claim as new and desire to secure by Letters Patent of the United States is:

1. A powered lawn mower incorporating mechanical piloting and sensing mechanism so as to direct the lawn mower along a series of straight parallel courses and to cause the lawn mower travel direction to be reversed at the end of each said course, comprising engine means linked to drive a pair of counter-rotating drive gears, a planetary differential coupling, the input of which is engageable alternatively with one or the other of said counter-rotating drive gears, with said planetary differential fitted with two output shafts, one of which is coupled to a rotatable sensor brush, and the other of which is coupled to a drive wheel on which the lawn mower is mounted, such that torque is transmitted to the drive wheel only when the said sensor brush encounters resistance torque, in which said planetary differential is mounted on a guide frame, which guide frame is pivotally rockably mounted to a wheel frame on which the drive wheel is rotatably mounted, with the input of said planetary differential engageable with the counter-rotating drive gears, such that in a first position of the guide frame, the input of the differential coupling is engaged to a first of said counter-rotating drive gears, and in a second position of the guide frame, the said input is engaged to the second of the two counter-rotating drive gears, so as to result in the rotation of the drive wheel by an output shaft of the differential coupling in a first direction, in the said first position of the guide frame; and to result in the rotation of the drive wheel by said output shaft in the reverse direction of said first direction, in the second position of the guide frame.

2. A powered lawn mower, incorporating the mechanism recited in claim 1, together with power means to move the lawn mower sidewise to the path of travel of the lawn mower so that upon completion of a straight path of travel in a given direction, with the guide frame in a first position, the lawn mower is moved sidewise by said power means so as to travel along a course parallel to said straight path of travel in the second position of the guide frame along a path in the reverse direction of said given direction.

* * * * *